United States Patent
Tanaka et al.

(10) Patent No.: US 12,166,713 B2
(45) Date of Patent: Dec. 10, 2024

(54) COMMUNICATION DEVICE AND COMMUNICATION METHOD

(71) Applicant: SONY GROUP CORPORATION, Tokyo (JP)

(72) Inventors: Ken Tanaka, Tokyo (JP); Yusuke Tanaka, Tokyo (JP); Kosuke Aio, Tokyo (JP); Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 383 days.

(21) Appl. No.: 17/624,131

(22) PCT Filed: Apr. 30, 2020

(86) PCT No.: PCT/JP2020/018255
§ 371 (c)(1),
(2) Date: Dec. 30, 2021

(87) PCT Pub. No.: WO2021/009992
PCT Pub. Date: Jan. 21, 2021

(65) Prior Publication Data
US 2022/0360390 A1 Nov. 10, 2022

(30) Foreign Application Priority Data

Jul. 12, 2019 (JP) .................................. 2019-129983

(51) Int. Cl.
*H04L 27/26* (2006.01)
*H04L 5/00* (2006.01)

(52) U.S. Cl.
CPC .......... *H04L 5/0048* (2013.01); *H04L 27/261* (2013.01)

(58) Field of Classification Search
CPC ... H04L 25/0226; H04L 27/261; H04L 5/001; H04L 5/0028; H04L 5/0037;
(Continued)

(56) References Cited

U.S. PATENT DOCUMENTS 9,793,965 B1 10/2017 Pustovalov et al.
2015/0146696 A1 5/2015 Elbwart et al.
(Continued)

FOREIGN PATENT DOCUMENTS

CN 104919880 A 9/2015
CN 106664156 A 5/2017
(Continued)

OTHER PUBLICATIONS

International Search Report and Written Opinion of PCT Application No. PCT/JP2020/018255, issued on Jul. 28, 2020, 12 pages of ISRWO.

*Primary Examiner* — Melvin C Marcelo
*Assistant Examiner* — Natali Pascual Peguero
(74) *Attorney, Agent, or Firm* — CHIP LAW GROUP

(57) ABSTRACT

A communication device that performs processing for estimating out-of-band leakage power is provided. The communication device includes a communication unit that transmits and receives wireless signals in a first frequency band and a second frequency band, and a control unit that controls a communication operation in the communication unit, transmits a reference signal in the first frequency band and the second frequency band, and receives a communication result from a transmission destination of the reference signal. The control unit determines the transmission destination of the reference signal on the basis of results of exchange of capability information with the first terminal and the second terminal, and performs control such that a notification signal for notifying of transmission of the ref- (Continued)

erence signal in advance is transmitted in the first frequency band and the second frequency band.

13 Claims, 12 Drawing Sheets

(58) Field of Classification Search
CPC ... H04L 5/0048; H04L 5/0066; H04L 5/0092; H04L 5/0026; H04W 8/24; H04W 84/12
See application file for complete search history.

(56) References Cited

U.S. PATENT DOCUMENTS

| | | |
|---|---|---|
| 2015/0311968 A1 | 10/2015 | Seok |
| 2015/0326339 A1 | 11/2015 | Huang |
| 2015/0333808 A1 | 11/2015 | Onodera et al. |
| 2015/0334730 A1 | 11/2015 | Wakabayashi et al. |
| 2016/0088641 A1 | 3/2016 | Kwon |
| 2017/0156148 A1 | 6/2017 | Park |
| 2018/0176918 A1* | 6/2018 | Hedayat ............ H04W 52/0245 |

FOREIGN PATENT DOCUMENTS

| | | |
|---|---|---|
| JP | 2010-136431 A | 6/2010 |
| JP | 2011-146988 A | 7/2011 |
| JP | 2012-060689 A | 3/2012 |
| JP | 2016-509792 A | 3/2016 |
| JP | 2017-108411 A | 6/2017 |
| JP | 2018-113700 A | 7/2018 |
| KR | 10-2015-0106410 A | 9/2015 |
| KR | 10-2017-0003921 A | 1/2017 |
| WO | 2013/024042 A1 | 2/2013 |
| WO | 2014/087775 A1 | 6/2014 |
| WO | 2014/111695 A1 | 7/2014 |
| WO | 2015/171336 A1 | 11/2015 |

* cited by examiner

COMMUNICATION DEVICE AND COMMUNICATION METHOD

CROSS REFERENCE TO RELATED APPLICATIONS

This application is a U.S. National Phase of International Patent Application No. PCT/JP2020/018255 filed on Apr. 30, 2020, which claims priority benefit of Japanese Patent Application No. JP 2019-129983 filed in the Japan Patent Office on Jul. 12, 2019. Each of the above-referenced applications is hereby incorporated herein by reference in its entirety.

TECHNICAL FIELD

A technology disclosed in the present description relates to a communication device and a communication method for transmitting and receiving a wireless signal.

BACKGROUND ART

In recent years, wireless communication technology has become widespread. For example, in a wireless local area network (LAN) standardized by IEEE 802.11 or the like, wireless data communication is performed between a base station and a subordinate terminal. In a situation where communication from a base station to many other terminals is required, it is important to reduce interference between terminals and realize simultaneous communication to many terminals with high efficiency.

When different frequency channels are assigned to multiple terminals from one base station for transmission, if allocated spectral densities differ between the terminals, a terminal with a low spectral density has a relatively low signal-to-interference and noise power ratio (SINR) due to out-of-band leakage of a transmission signal to a terminal with a high spectral density and thus has a problem that the quality of a received signal deteriorates. Although the upper limit of out-of-band leakage is generally specified, the actual out-of-band leakage power depends on a designed radio frequency (RF) circuit and additionally the characteristics change due to aging deterioration, and thus it is difficult to estimate the out-of-band leakage only on a transmitter side.

For example, a transmission method for reducing interference by changing the number of subcarriers used for data transmission according to the performance of a device of a transmission destination and loading no signal on an adjacent frequency channel has been proposed (refer to PTL 1). Further, a communication system for reducing interference by decreasing the power of a frequency channel and the number of modulation multi-values has also been proposed (refer to PTL 2).

Moreover, with respect to the problem of interference due to out-of-band leakage power when a plurality of terminals perform a reception response to a base station on uplink, a wireless communication system for controlling the amount of interference by controlling power of a reception response or controlling a transmission time has been proposed (refer to PTL 3).

CITATION LIST

Patent Literature

[PTL 1]
  JP No. 2012-60689 A
[PTL 2]
  JP No. 2010-136431 A
[PTL 3]
  JP No. 2011-146988 A

SUMMARY

Technical Problem

An object of the technology disclosed in the present description is to provide a communication device and a communication method operating in a communication system that performs data transmission from a base station to a plurality of terminals using different frequency bands.

Solution to Problem

The technology disclosed in the present description has been made in consideration of the above-mentioned problems, and the first aspect thereof is a communication device including
  a communication unit that transmits and receives wireless signals in a first frequency band and a second frequency band, and
  a control unit that controls a communication operation in the communication unit,
  wherein the control unit transmits a reference signal in the first frequency band and the second frequency band and controls an operation of receiving a communication result from a transmission destination of the reference signal.

The control unit determines the transmission destination of the reference signal on the basis of results of exchange of capability information with the first terminal and the second terminal and performs control such that a notification signal for notifying of transmission of the reference signal in advance is transmitted in the first frequency band and the second frequency band. In addition, the control unit controls communication with the first terminal in the first frequency band and communication with the second terminal in the second frequency band to be simultaneously performed.

Further, a second aspect of the technology disclosed in the present description is a communication method in a communication device that transmits and receives wireless signals in a first frequency band and a second frequency band, including a step of transmitting a reference signal in the first frequency band and the second frequency band, and
  a step of receiving a communication result from a transmission destination of the reference signal.

In addition, a third aspect of the technology disclosed in the present description is a communication device including
  a communication unit that transmits and receives wireless signals in a first frequency band and a second frequency band, and
  a control unit that controls a communication operation in the communication unit,
  wherein the control unit receives a reference signal in the first frequency band and the second frequency band and controls an operation of transmitting a communication result to a transmission source of the reference signal.

The control unit controls the reference signal to be received in the first frequency band and the second frequency band in response to reception of a notification signal for notifying of transmission of the reference signal in advance. Further, the control unit estimates signal quality of the reference signal received in the first frequency band and the second frequency band and controls the signal quality to be transmitted as the notification result based on the estimation result.

In addition, a fourth aspect of the technology disclosed in the present description is a communication method in a communication device that transmits and receives wireless signals in the first frequency band and the second frequency band, including a step of receiving a reference signal in the first frequency band and the second frequency band, and a step of controlling an operation of transmitting a communication result to a transmission source of the reference signal.

Advantageous Effects of Invention

According to the technology disclosed in the present description, it is possible to provide a communication device and a communication method for performing processing for estimating out-of-band leakage power at the time of transmitting data from a base station to a plurality of terminals using different frequency bands.

Further, according to the technology disclosed in the present description, it is possible to provide a communication device and a communication method for controlling the number of modulation multi-values and a coding method assigned to each terminal on the basis of results of estimation out-of-band leakage power.

Further, according to the technology disclosed in the present description, it is possible to provide a communication device and a communication method for notifying of information for determining the number of modulation multi-values and a coding method allocated to each terminal or notifying of the number of modulation multi-values and a coding method allocated to each terminal.

Meanwhile, the effects described in the present description are merely illustrative and effects provided by the technology disclosed in the present description are not limited thereto. In addition, the technology disclosed in the present description may further obtain additional effects in addition to the aforementioned effects.

Other objects, features, and advantages of the technology disclosed in the present description will become clear according to detailed description based on embodiments which will be described later and the attached drawings.

DESCRIPTION OF EMBODIMENTS

Hereinafter, embodiments of the technology disclosed in the present description will be described in detail with reference to the drawings.

A. System Configuration

Figure 1:
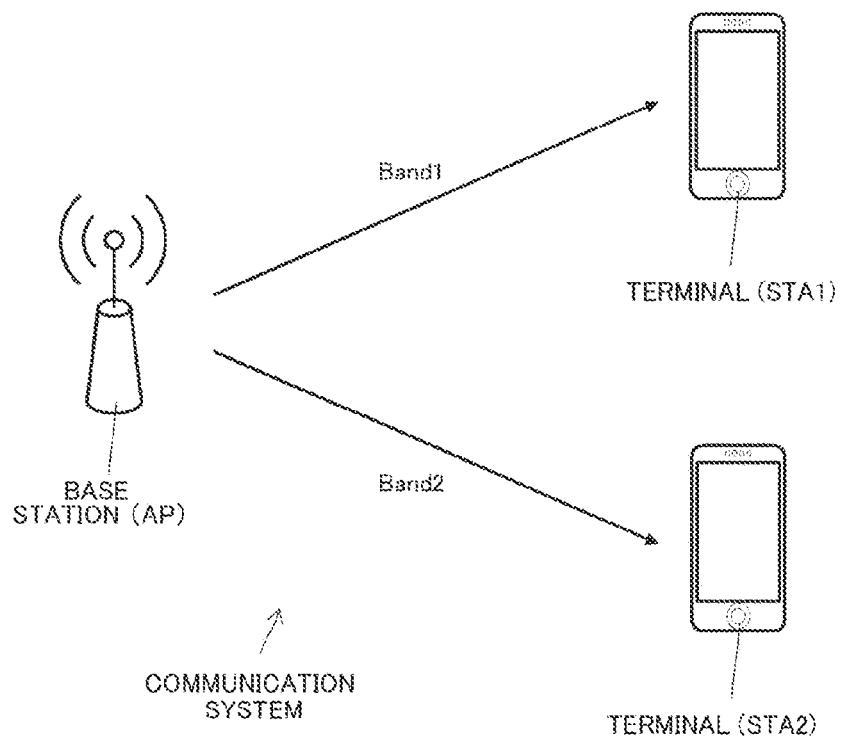
FIG. 1 is a diagram illustrating a configuration example of a communication system.

FIG. 1 schematically illustrates a configuration example of a communication system to which the technology disclosed in the present description is applied. The illustrated communication system includes one base station (AP) and a plurality of terminals (STA1 and STA2) connected to the base station. Although different frequency bands of Band1 and Band2 can be used in the communication system, it is assumed that the AP performs wireless communication with STA1 using Band1 and performs wireless communication with STA2 using Band2. Here, it is assumed that Band1 and Band2 are adjacent frequency bands. Although connecting three or more terminals to one base station is conceivable, only two are shown here for simplification of description. Further, three or more frequency bands including frequency bands other than Band1 and Band2 may be available in the communication system.

Figure 2:
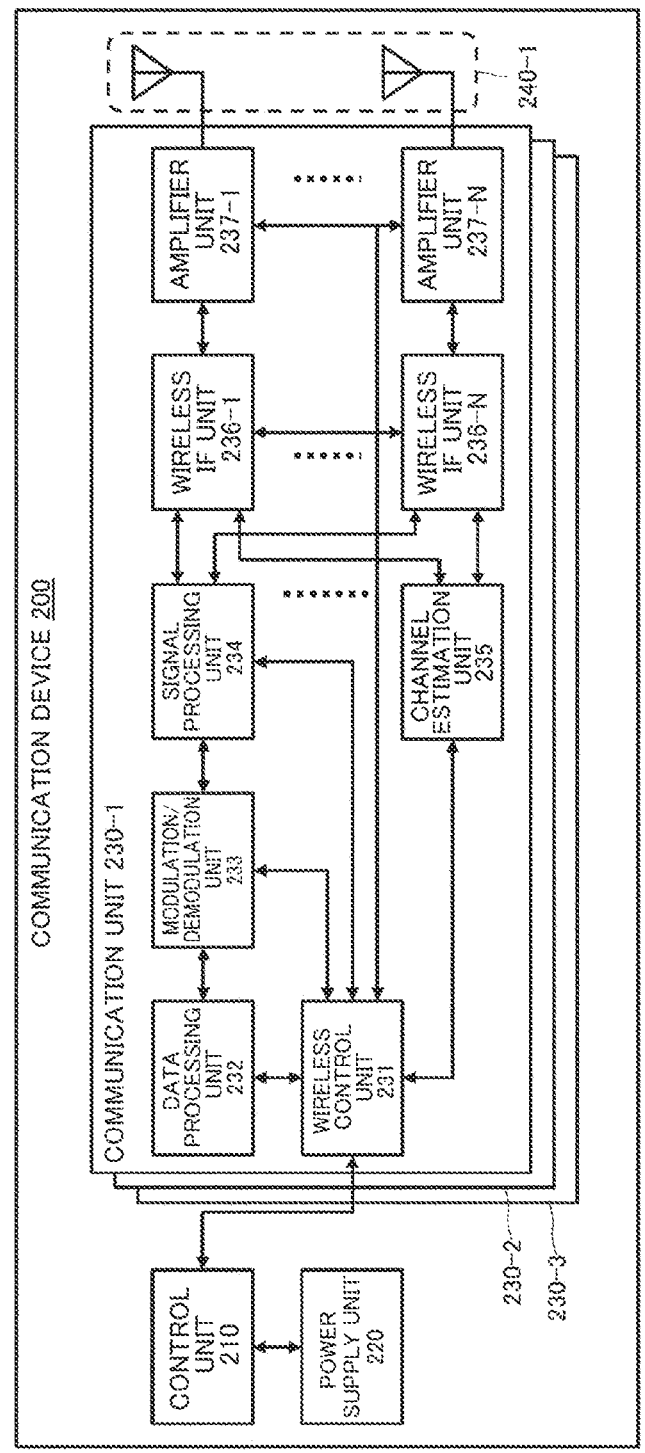
FIG. 2 is a diagram illustrating a configuration example of a communication device 200.

FIG. 2 illustrates a configuration example of a communication device 200 capable of operating as the AP or any STA in the aforementioned communication system.

The illustrated communication device 200 includes a control unit 210, a power supply unit 220, a plurality of (three in the illustrated example) communication units 230-1, 230-2, and 230-3, and an antenna unit 240-1, . . . for each communication unit 230-1, . . . . . It is assumed that the communication units 230-1, 230-2, and 230-3 operate in different frequency bands. Since the communication system illustrated in FIG. 1 is assumed to operate in two frequency bands of Band1 and Band2, the communication device 200 is equipped with at least two communication units 230-1 and 230-2 when the communication device 200 is an AP because wireless communication is performed in both the frequency bands of Band1 and Band2. When the communication device 200 is STA1 or STA2, it may be equipped with only a communication unit corresponding to one of Band1 and Band2 to be used. Since the communication units 230-1 and the antenna units 240-1 for the respective communication units 230-2 have the same configurations, they will be referred to below as the communication unit 230 and the antenna unit 240 for simplification.

The communication unit 230 may be composed of, for example, a processor such as a microprocessor and a circuit and may include a wireless control unit 231, a data processing unit 232, a modulation/demodulation unit 233, a signal processing unit 234, a channel estimation unit 235, a plurality of wireless interface (IF) units 236-1, . . . , 236-N arranged in parallel, and amplifier units 237-1, . . . , 237-N connected in series to the respective wireless interface units 236-1, . . . , 236-N (here, N is an integer of 2 or more). In addition, each antenna element constituting the antenna unit 240 corresponding to the communication unit 230 is connected to each of the amplifier units 237-1, . . . , 237-N.

The wireless interface unit 236, the amplifier unit 237, and the antenna element in the antenna unit 240 connected in series may be regarded as one set, and one or more sets may be components of the communication unit 230. Further, the wireless interface units 236-1, . . . , 236-N may have functions of the amplifier units 237-1, . . . , 237-N corresponding thereto.

The data processing unit 232 generates a packet for wireless transmission from data at the time of transmission when the data is input from a higher layer of a communication protocol thereof, and additionally performs processing such as addition of a header and addition of an error detection code for media access control (MAC) and provides the processed data to the modulation/demodulation unit 233. Further, the data processing unit 232 performs MAC header analysis, packet error detection, packet reorder processing, and the like at the time of receiving an input from the modulation/demodulation unit 233 and outputs the processed data to the higher layer of the protocol thereof.

The wireless control unit 231 controls transfer of information between units in the communication device 200. Further, the wireless control unit 231 performs parameter setting in the modulation/demodulation unit 233 and the signal processing unit 234, packet scheduling in the data processing unit 232, and parameter setting and transmission power control in the wireless interface unit 236 and the amplifier unit 237.

At the time of transmission, the modulation/demodulation unit 233 performs coding, interleaving, and modulation processing on input data from the data processing unit 232 on the basis of a coding method and a modulation method set by the wireless control unit 231 to generate a data symbol stream and provides the data symbol stream to the signal processing unit 234. Further, at the time of reception, the modulation/demodulation unit 233 performs demodulation processing, deinterleaving, and decoding processing opposite to those at the time of transmission on the input symbol stream from the signal processing unit 234 and provides the data to the data processing unit 232 or the wireless control unit 231.

At the time of transmission, the signal processing unit 234 performs signal processing for spatial separation on input from the modulation/demodulation unit 233 as necessary and provides one or more obtained transmission symbol streams to the respective wireless interface units 236-1, . . . , 236-N. Further, at the time of reception, the signal processing unit 234 performs signal processing on received symbol streams input from the respective wireless interface units 236-1, . . . , 236-N, spatially decomposes the streams as necessary, and provides the spatially decomposed streams to the modulation/demodulation unit 233.

The channel estimation unit 235 calculates complex channel gain information of a propagation path from preamble portions and training signal portions of the input signals from the respective wireless interface units 236-1, . . . , 236-N. The calculated complex channel gain information is used for demodulation processing in the modulation/demodulation unit 233 and spatial processing in the signal processing unit 234 via the wireless control unit 231.

At the time of transmission, the wireless interface unit 236 converts the input from the signal processing unit 234 into an analog signal, performs filtering, up-conversion to a carrier frequency, and phase control and sends the signal to the corresponding amplifier unit 237 or antenna unit 240. Further, at the time of reception, the wireless interface unit 236 performs processing such as down-conversion, filtering, and conversion to a digital signal, opposite to those at the time of transmission, on the input from the corresponding amplifier unit 237 or antenna unit 240 and provides the processed data to the signal processing unit 234 and the channel estimation unit 235.

At the time of transmission, the amplifier unit 237 amplifies the analog signal input from the wireless interface unit 236 to predetermined power and sends the amplified signal to the corresponding antenna element in the antenna unit 240. Further, at the time of reception, the amplifier unit 237 amplifies a signal input from the corresponding antenna element in the antenna unit 240 to predetermined power with low noise and outputs the signal to the wireless interface unit 236.

The wireless interface unit 236 may have at least one of the function at the time of transmission and the function at the time of reception of the amplifier unit 237. Further, the amplifier unit 237 may have at least one of the function at the time of transmission and the function at the time of reception as a component other than the communication unit 230.

A set of a wireless interface unit 236 and an amplifier unit 237 constitutes one radio frequency (RF) branch. It is assumed that transmission and reception of one band can be performed through one RF branch. In the device configuration example illustrated in FIG. 2, the communication unit 230 includes N RF branches.

The control unit 210 may be composed of, for example, a processor such as a microprocessor and a circuit and control the wireless control unit 231 and the power supply unit 220. Further, the control unit 210 may perform at least a part of the above-described operation of the wireless control unit 231 instead of the wireless control unit 231. In particular, in the present embodiment, the control unit 210 and the wireless control unit 231 control the operation of each unit in order to realize the operation according to each embodiment that will be described later.

The power supply unit 220 is composed of a battery power supply or a fixed power supply and supplies power for driving to the communication device 200.

The communication unit 230 may be configured to change to a standby state or a sleep state (or a state in which at least a part of the function is stopped) to reduce power consumption while the communication device 200 is on standby. Although the communication unit 230 includes N RF branches in the device configuration example illustrated in FIG. 2, the communication unit 230 may be configured such that it can change to a standby state or a sleep state for each RF branch. However, when data transmission/reception according to carrier aggregation is performed, at least as many RF branches as the number of bands to be aggregated need to be returned to a normal operating state.

The control unit 210 and the communication unit 230 can be combined into one or a plurality of large scale integration (LSI) circuits.

B. Simultaneous Utilization of Adjacent Frequency Bands

Figure 3:
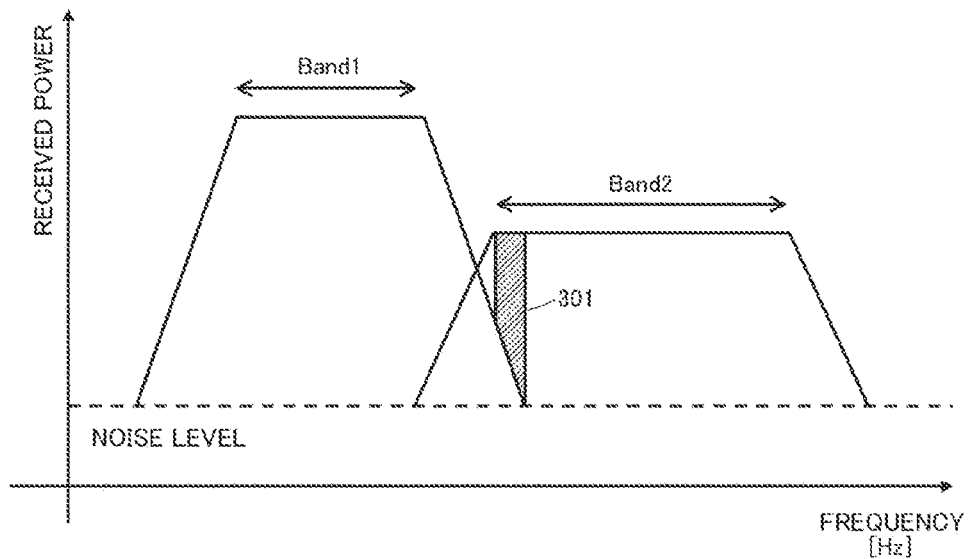
FIG. 3 is a diagram illustrating the spectrum of a transmission signal when an AP simultaneously transmits the signal to STA1 and STA2 using Band1 and Band2, respectively.
Figure 4:
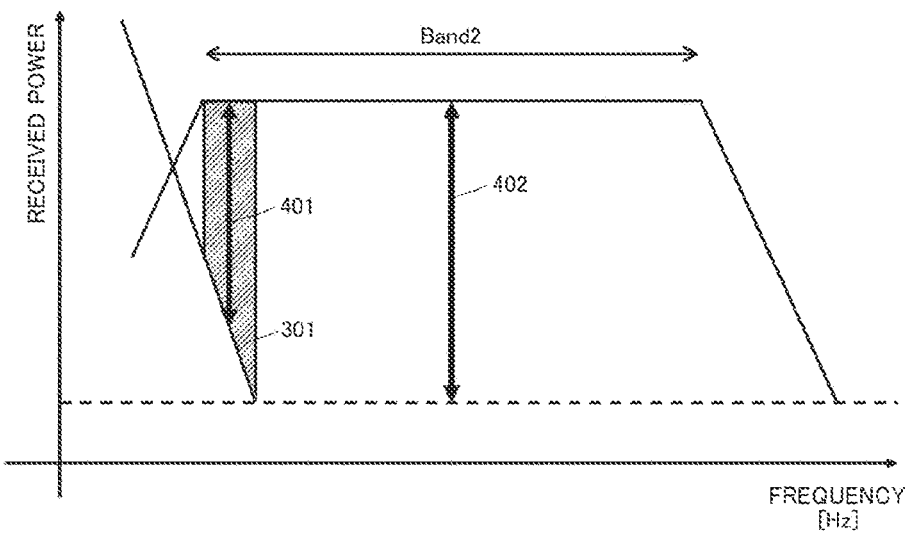
FIG. 4 is an enlarged view of a region that receives interference between adjacent frequency bands.

FIG. 3 illustrates the spectrum of a transmission signal when an AP simultaneously transmits the signal to STA1 and STA2 using Band1 and Band2, respectively. As described above, Band1 and Band2 are adjacent frequency bands. Therefore, Band2 is affected by out-of-band leakage from Band1, and conversely, Band1 is affected by out-of-band leakage from Band2. In FIG. 3, a shaded region indicated by reference numeral 301 is a region that receives interference between adjacent frequency bands. Further, FIG. 4 illustrates an enlarged region 301 that receives interference between adjacent frequency bands.

Generally, even if the power of a transmission signal is the same, the spectral density varies if different bandwidths are used for transmission. In Orthogonal Frequency Division Multiplexing (OFDM) modulation, transmission data is loaded on an arbitrary subcarrier, but leakage power is generated outside the frequency band on which the transmission data is loaded. As illustrated in FIGS. 3 and 4, when adjacent frequency bands are used, particularly, an SINR decreases because interference due to leakage power locally increases near the boundary of the bands. In FIG. 4, reference numeral 401 indicates an SINR affected by out-of-band leakage and reference numeral 402 indicates an SINR that is not affected by out-of-band leakage.

It is possible to reduce leakage power to a frequency band other than a desired one using a component such as a bandpass filter (well known). However, it is difficult to accurately obtain characteristics of the filter due to aging and the like. Accordingly, even on a propagation path with flat frequency characteristics, it is necessary to determine an optimum modulation and coding scheme (MCS) for each quality of a received signal because the quality of a received signal for each frequency band differs due to interference.

Therefore, in the present description, a sounding method for efficiently estimating deterioration of the quality of a received signal due to out-of-band leakage and an MCS notification method determined according to the quality of the received signal will be described below. In the present description, a communication procedure for estimating signal quality in a desired band in which a desired signal is sent and signal quality of an interference signal received due to out-of-band leakage and feeding back the estimation result is referred to as "Out band Sounding." In addition, signaling information for notifying of an MCS changed for each frequency will be referred to as "Multi-Band Operation (MBO) SIG."

In Out band Sounding, each frame of a Partial Sounding Announcement by which an AP notifies an STA of the start of sounding in advance, P (Partial)-NDP (Null Data Packet)-I (Interference) and P-NDP-S(Signal), or P-NDP-S/I, which are frames for estimating the quality of a signal transmitted by the AP, and Feedback by which the STA notifies the AP of information regarding an MCS of a transmission signal on the basis of the estimation result is used. When the AP obtains Feedback frames from a plurality of STAs, a separate Trigger frame may be required.

Here, P-NDP-S is a sounding frame for sounding only a desired band, and P-NDP-I is a sounding frame for sounding an interference band. Further, P-NDP-S/I is a sounding frame for sounding a desired band and an interference band.

By designing a sequence for signal quality estimation included in P-NDP-S, P-NDP-I, and P-NDP-S/I on the basis of a frequency and a range to be estimated, the frame lengths of these sounding frames can be reduced.

Further, in MBO-SIG, it is possible to improve a transmission rate by notifying of simultaneous change in an MCS with respect to arbitrarily grouped subcarriers.

Example 1

Figure 5:
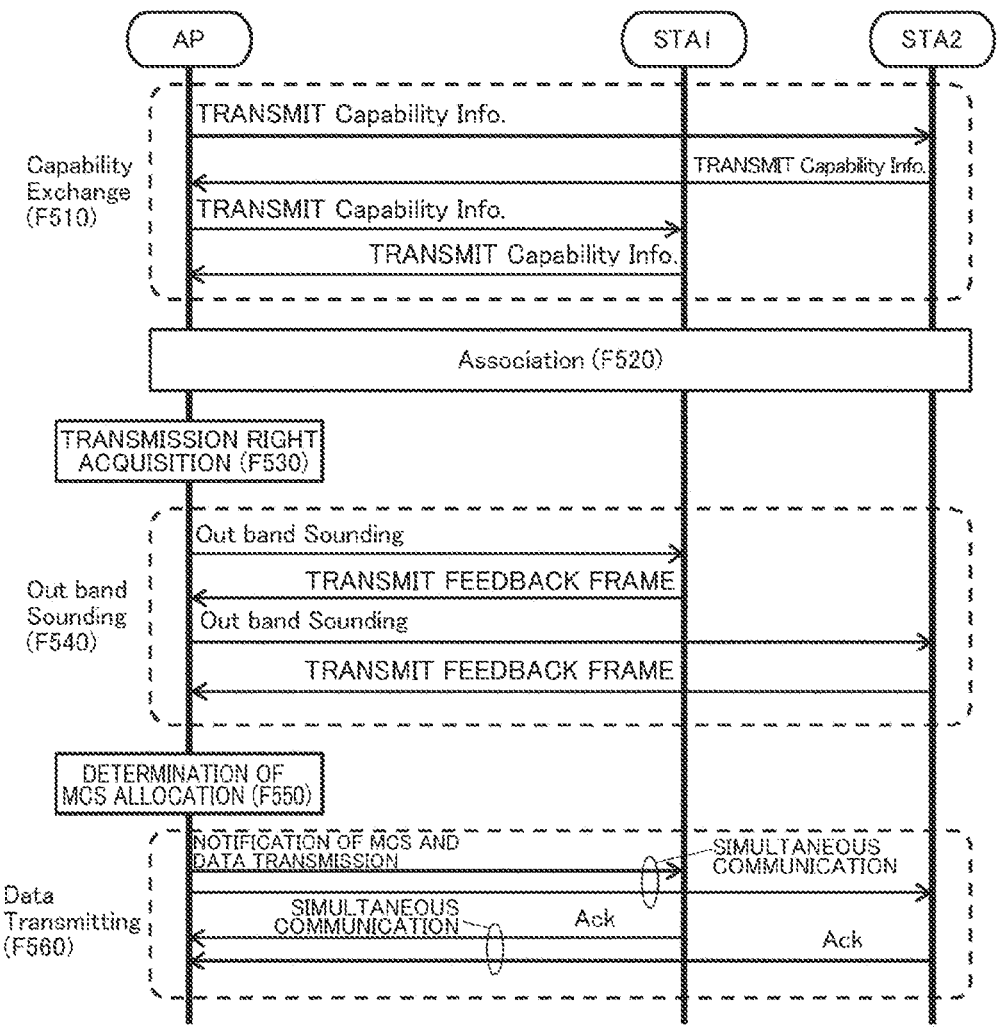
FIG. 5 is a diagram illustrating an example of a communication sequence executed between the AP and STA1 and STA2 (first embodiment).

FIG. 5 illustrates an example of a communication sequence executed between an AP and STA1 and STA2 as a first example. In the communication system including the AP, STA1 and STA2, it is assumed that the AP performs wireless communication with STA1 using Band1 and performs wireless communication with STA2 using Band2, as illustrated in FIG. 1. Further, it is assumed that the AP, STA1 and STA2 have the device configuration illustrated in FIG. 2 and can perform wireless communication using Band1 and Band2.

In the communication sequence illustrated in FIG. 5, six phases of Capability Exchange, Association, transmission right acquisition, Out band Sounding, determination of MCS allocation, and Data Transmitting are mainly assumed. The order in which the phases are executed is not limited to the example illustrated in FIG. 5. For example, Capability Exchange may be performed after Association. Further, each phase does not necessarily have to be separated. For example, Capability Exchange and Association may be simultaneously performed.

In the Capability Exchange phase (F510), capability information is exchanged between the AP and STA2 and between the AP and STA1. The main feature of this example is that information on whether Out band Sounding can be executed is exchanged between the AP and STA1 and STA2. Details of the capability information exchanged between the AP and STA1 and STA2 and details of a frame used to exchange the capability information will be described later.

In the Association phase (F520), processing for connection between the AP and STA1 and between the AP and STA2 is completed. Association may be executed by an association request from each of STA1 and STA2 and an association response from the AP, for example, in accordance with IEEE 802.11 standards.

In the transmission right acquisition phase (F530), an agreement is made between the AP and STA1 and STA2 to transmit data from the AP to STA1 and STA2. For example, the AP may acquire the transmission right in accordance with Carrier Sense Multiple Access with Collision Avoidance (CSMA/CA).

In the Out band Sounding phase (F540), transmission of a frame for signal quality estimation from the AP to STA1 and STA2 and feedback from STA1 and STA2 are performed. Specifically, when the AP performs simultaneous transmission to STA1 and STA2 using Band1 and Band2, STA1 estimates out-of-band leakage power in a desired band (Band1) on the basis of the frame for signal quality estimation and notifies the AP of information that can determine an MCS that can be received with desired quality in Band1 on the basis of the estimation result through a Feedback frame. Further, STA2 also estimates out-of-band leakage power in a desired band (Band2) on the basis of the frame for signal quality estimation and notifies the AP of information that can determine an MCS that can be received with desired quality in Band2 on the basis of the estimation result through a Feedback frame. The information of which the AP is notified by STA1 and STA2 may be, for example, information for specifying a transmission rate and an SINR. Details of the Out band Sounding phase in this example will be described later.

It is desirable that the Out band Sounding phase always be executed before determination of MCS allocation. However, when the AP side determines that it is not necessary to perform the Out band sounding phase before every determination of MCS allocation, it may be omitted.

In the MCS allocation determination phase (F550), the AP determines an MCS of a signal to be transmitted by the AP to each of STA1 and STA2 in the subsequent data transmission phase (F560) for each subcarrier or for each group of subcarriers (in other words, for each frequency resource block) on the basis of the information notified of by STA1 and STA2 through the Feedback frame in the Out band Sounding phase (F540).

In the data transmission phase (F560), data is transmitted from the AP to STA1 and STA2 using the MCS determined in the MCS allocation determination phase (F550). Prior to data transmission (specifically, according to MBO-SIG in the header of a data frame), each of STA1 and STA2 is notified of the MCS to be used. In this notification, the MCS is notified of for each subcarrier or for each group of sub carriers.

Figure 6:
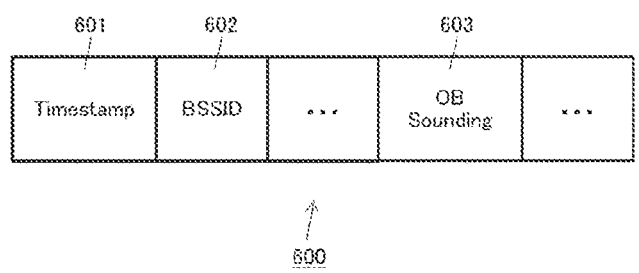
FIG. 6 is a diagram illustrating a configuration example of a capability information frame 600.

FIG. 6 illustrates a configuration example of a capability information frame 600 used to exchange capability information in the capability exchange phase (F510).

Information for synchronizing time between transmission and reception of the frame is stored in a Timestamp field indicated by reference numeral 601.

Identification information of a Basic Service Set (BSS) to which a communication terminal that is a transmission source of the frame belongs is stored in a BSSID field indicated by reference numeral 602.

Information on whether the communication terminal that is the transmission source of the frame can perform Out band Sounding and information on a frame length for channel estimation which can be transmitted/received in Out band Sounding are stored in an OB Sounding field indicated by reference numeral 603. Here, the frame length for channel estimation that can be transmitted and received does not have to be uniquely determined and may be information that can correspond to three types at the time of transmission and two types at the time of reception, for example.

Figure 7:
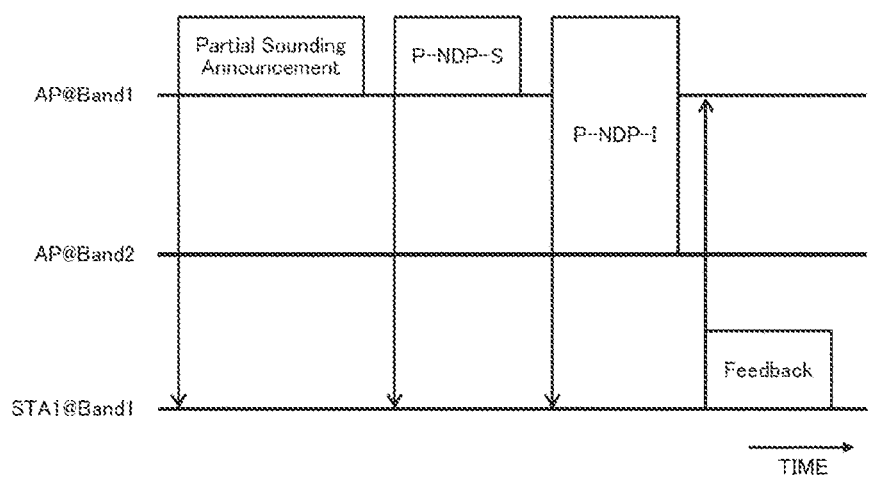
FIG. 7 is a diagram illustrating an example of a frame exchange sequence executed in an Out band Sounding phase (first embodiment).

FIG. 7 illustrates an example of a frame exchange sequence executed in the Out band Sounding phase (F540) in this example. However, the horizontal axis is assumed to be a time axis. Further, a square box indicates a frame transmitted by the AP or STA1 in a frequency band (Band1 or Band1) corresponding to the horizontal axis thereof, and the tip of an arrow extending from each box indicates a transmission destination of the frame.

In the Out band Sounding phase (F540), three types of frames, Partial Sounding Announcement, P-NDP-S, and P-NDP-I, are transmitted from the AP to STA 1, and then a Feedback frame is returned from STA 1 to the AP.

The AP transmits a Partial Sounding Announcement frame on Band1, which is a desired band used for data transmission to STA1, in order to notify STA1 of the start of sounding. The Partial Sounding Announcement frame includes information on frames for signal quality estimation (P-NDP-S and P-NDP-I) transmitted immediately thereafter.

Subsequently, the AP transmits, on Band1, a P-NDP-S frame used for STA1 to estimate received signal quality in Band1 that is a desired band. STA1 may use the P-NDP-S frame to estimate the received power of a desired signal.

Subsequently, the AP transmits, on Band2, a P-NDP-I frame used for STA1 to estimate received signal quality in Band2 that is an interference band. STA1 estimates the received power of a signal that leaks out of band from Band2 to Band1 using the P-NDP-I frame.

Although P-NDP-S and P-NDP-I are transmitted in order after the Partial Sounding Announcement frame in the frame exchange sequence example illustrated in FIG. 7, they may not be transmitted in this order. Further, P-NDP-S and P-NDP-I (in other words, sounding for estimating the received power of a desired signal and the received power of a leak signal, respectively) may be collectively transmitted as one frame.

STA1 estimates the signal quality of a desired signal and the signal quality of a leak signal using the P-NDP-S and P-NDP-I frames and returns a Feedback frame in which information based on the estimation result is stored to the AP on Band1 that is the desired band. The Feedback frame stores information about an MCS (or information that can determine the MCS) that needs to be set when Band1 is allocated to STA1 when the AP simultaneously transmits a wireless signal in Band1 and Band2.

Sounding of an out-of-band leak signal from an adjacent band to a desired band is also referred to as "Partial Sounding" in the present description. When the AP determines that information obtained through a Feedback frame for previously executed Partial Sounding can be used, the AP may determine an MCS on the basis of the information obtained through the previous Feedback frame without performing Partial Sounding and execute data transmission. On the other hand, the AP may request retransmission from STA1 when a Feedback frame cannot be received from STA1 after Partial Sounding is performed.

Although only the frame exchange sequence between the AP and STA1 is shown in FIG. 7, it is assumed that the same frame exchange sequence is also executed between the AP and STA2 in the Out band Sounding phase (F540).

Figure 8:
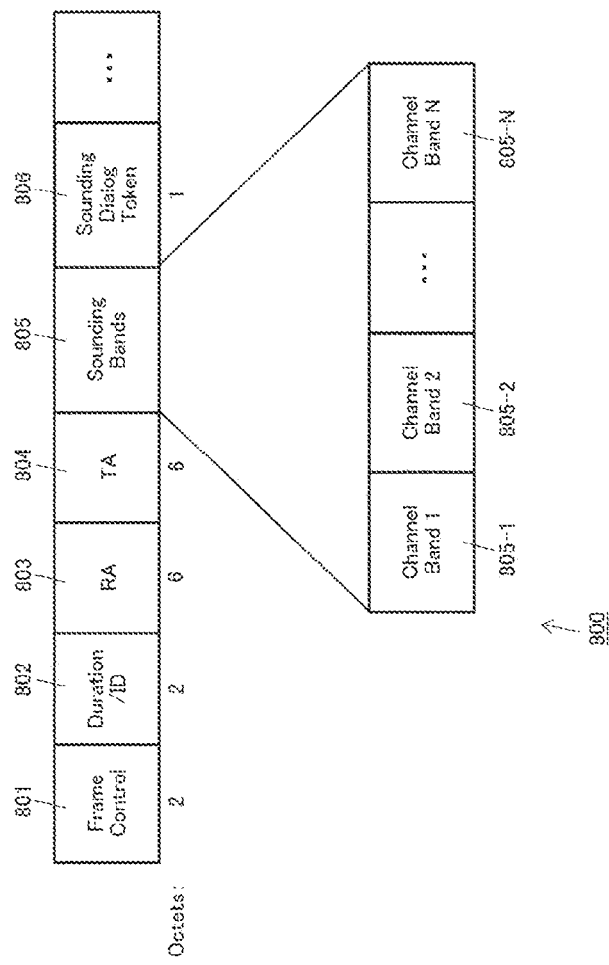
FIG. 8 is a diagram illustrating a configuration example of a Partial Sounding Announcement frame 800.

FIG. 8 illustrates a configuration example of a Partial Sounding Announcement frame 800. The frame 800 is used by the AP to notify an STA of the start of Out band Sounding.

Information indicating that the frame is Partial Sounding Announcement is stored in a Frame Control field indicated by reference numeral 801. Information indicating the length of the frame is stored in a Duration/ID field indicated by reference numeral 802.

Information for identifying an STA that is the transmission destination of the frame (Receiver Address) is stored in an RA field indicated by reference numeral 803, and information for identifying an AP that is the source of the frame (Transmitter Address) is stored in a TA field indicated by reference numeral 804. For example, MAC addresses may be used as information for identifying communication terminals that are a transmission destination and a transmission source.

Information indicating an order and a frequency band in which subsequent P-NDP frames are sent is stored in a Sounding Bands field indicated by reference numeral 805. The order in which the P-NDP frames are sent may be information indicating a transmission start time.

In the example illustrated in FIG. 8, the Sounding Bands field 805 includes fields of Channel Band1, Channel Band2, . . . , and Channel BandN respectively indicated by reference numerals 805-1, 805-2, . . . , 805-N. Information on a frequency band in which sounding frames of P-NDP-S and P-NDP-I are sent immediately after the Partial Sounding Announcement frame 800 is stored in the Channel Band1 field 805-1. Likewise, information on a frequency band in which sounding frames of P-NDP-S and P-NDP-I are sent immediately thereafter is stored in Channel Band2. For example, information indicating a transmission start time and transmission order of the corresponding sounding frame, and types of P-NDP-S and P-NDP-I (representing whether they are sounding frames of a desired signal and an out-of-band interference signal), and the like may be stored in each of Channel Band fields 805-1, 805-2, . . . , 805-N.

A sounding time or information used for the AP to distinguish the corresponding Partial Sounding from another Partial Sounding is stored in a Sounding Dialog Token field indicated by reference numeral 806.

Figure 9:
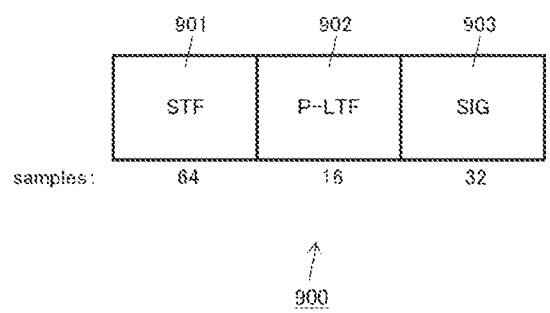
FIG. 9 is a diagram illustrating a configuration example of a P-NDP-S frame 900 (first embodiment).

FIG. 9 illustrates a configuration example of a P-NDP-S frame 900. The frame 900 is transmitted by the AP in order to estimate the quality of a received signal (or the received power of a desired signal) in a desired band (Band1 in the example illustrated in FIG. 7) on the side of an STA that has received the frame.

Information (for example, a known signal sequence) used by a communication terminal that has received the frame 900 for time synchronization and frequency synchronization is stored in a Short Training Field (STF) field indicated by reference numeral 901.

Information (e.g., a reference signal including a known signal sequence) used by the communication terminal that has received the frame 900 to estimate the quality of a received signal (P-NDP-S) in a desired band is stored in a Partial-Long Training Sequence (P-LTF) field indicated by reference numeral 902.

Here, P-LTF may include information for allowing the quality of only some frequencies to be estimated in signal quality estimation in a desired band (Band1 in the example illustrated in FIG. 7). That is, the frame length of P-LTF may be dynamically changed such that the signal quality of only some of Band1 (or Band1) can be estimated. The field length of P-LTF may be changed to be shorter than STF when a frequency for which signal quality is to be estimated is a plurality of consecutive subcarriers (an STF field 901 has a length of 64 bits whereas the P-LTF field 902 has a length of 16 bits in the example illustrated in FIG. 9). For example, in a case where a subcarrier number k has values of −32, −31, . . . , 31, when it is desired to estimate the signal quality of only 16 subcarriers of −32≤k≤−25, a sequence $L_1(s)$ according to the following formulas (1) and (2) may be used. However, s is a sample number in P-LTF, and $L_1(s)$ consists of 16 samples (s=0, 1, . . . , 15).

[Math. 1]

$$K_1(n) = \begin{cases} 1 & n = -7 \\ 0 & \text{otherwise} \end{cases} \quad (1)$$

[Math. 2]

$$L_1(S) = \frac{1}{\sqrt{16}} \sum_{n=-8}^{7} K_1(n) e^{\frac{j2\pi n}{T}S} \quad (2)$$

Further, in a case where the subcarrier number k has values of −64, −63, . . . , 63, when it is desired to estimate the signal quality of only eight subcarriers of 56≤k≤63, a sequence $L_2(s)$ according the following formulas (3) and (4) may be used. However, s is a sample number in P-LTF, and $L_2(s)$ consists of 16 samples (s=0, 1, . . . , 7).

[Math. 3]

$$K_2(n) = \begin{cases} 1 & n = 4 \\ 0 & \text{otherwise} \end{cases} \quad (3)$$

[Math. 4]

$$L_2(S) = \frac{1}{\sqrt{8}} \sum_{n=-3}^{4} K_2(n) e^{\frac{j2\pi n}{T}S} \quad (4)$$

Figure 10:
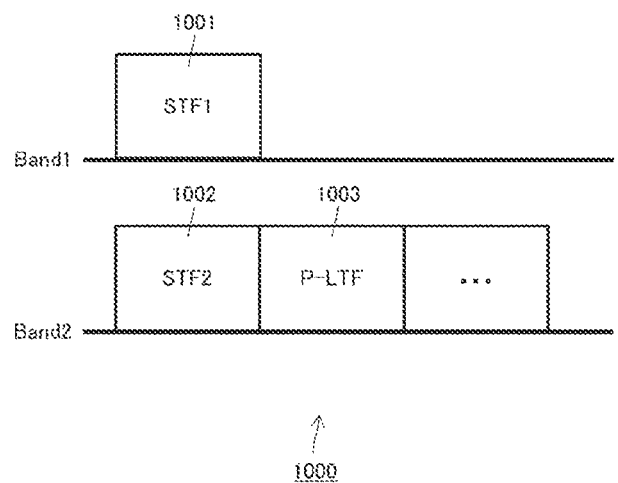
FIG. 10 is a diagram illustrating a configuration example of a P-NDP-I frame 1000 (first embodiment).

FIG. 10 illustrates a configuration example of a P-NDP-I frame 1000. The frame 900 is transmitted by the AP in order to estimate the quality of a signal leaking from a band adjacent to a desired band (Band2 in the example illustrated in FIG. 7) to the desired band (or the received power of an interference signal) on the side of an STA that has received the frame.

Information used by a communication terminal that has received the frame 1000 in Band1 for time synchronization and frequency synchronization is stored in an STF1 field indicated by reference numeral 1001. Further, information used by a communication terminal that has received the frame 1000 in Band2 for time synchronization and frequency synchronization is stored in an STF2 field indicated by reference numeral 1002.

Information used by the communication terminal that has received the frame 1000 in Band2 to estimate the quality of an interference signal (P-NDP-I) leaking from an adjacent band to a desired band is stored in a P-LTF field indicated by reference numeral 1003. A known signal sequence similar to the P-LTF field 902 of the P-NDP-S frame 900 may be used for the P-LTF field 1003.

Figure 11:
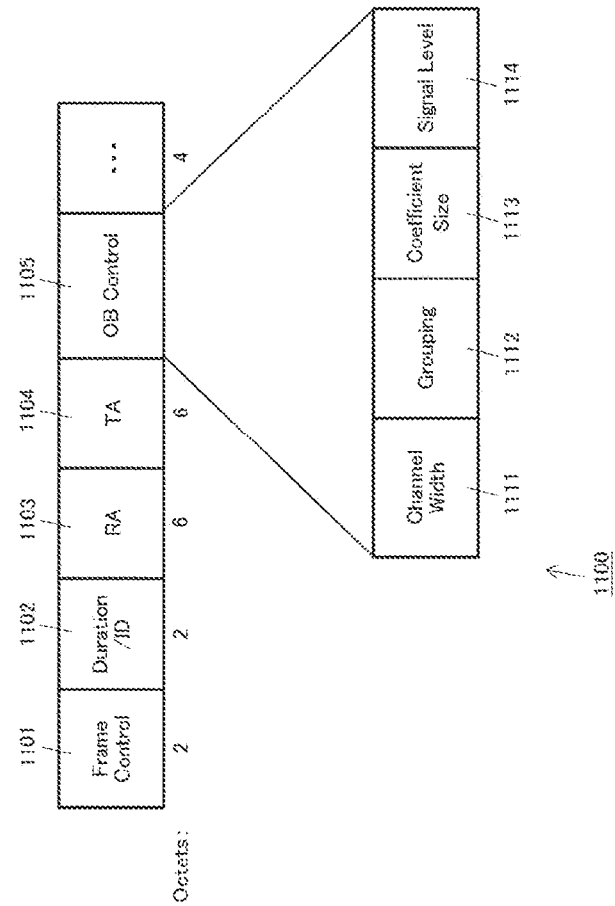
FIG. 11 is a diagram illustrating a configuration example of a Feedback frame 1100.

FIG. 11 illustrates a configuration example of a Feedback frame 1100. The frame 1100 is used by an STA to feedback results of estimation of the signal quality of a desired signal and the signal quality of a leak signal using the P-NDP-S and P-NDP-I frames or information based on the estimation results to the AP.

Information indicating that the frame is Partial Sounding Announcement is stored in a Frame Control field indicated by reference numeral 1101. Information indicating the length of the frame is stored in a Duration/ID field indicated by reference numeral 1102.

Information for identifying the AP that is the transmission destination of the frame is stored in an RA field indicated by reference numeral 1103, and information for identifying the STA that is the source of the frame is stored in a TA field indicated by reference numeral 1104. For example, MAC addresses may be used as information for identifying communication terminals that are a transmission destination and a transmission source.

An Out band (OB) Control field indicated by reference numeral 1105 includes Channel Width, Grouping, Coefficient Size, and Signal Level fields respectively indicated by reference numerals 1111 to 1114.

Information indicating a frequency band in which the frame 1100 is to be transmitted is included in the Channel Width field 1111. Further, information representing information for determining an MCS to be set when the AP that is the reply destination of the frame 1100 transmits data to the STA that is the reply source of the frame 1100 for each subcarrier is stored in a Signal Level field 1114. For example, a received signal level of P-NDP-S in each subcarrier, a ratio of received signal levels between P-NDP-S and P-NDP-I, and the like are stored in a Signal Level field 1114.

Information on all subcarriers does not necessarily have to be stored in the Signal Level field 1114, and for example, only information thinned out at predetermined intervals may be stored. When information is thinned out, information indicating which subcarrier information is stored in the Signal Level field is stored in a Grouping field 1112.

Information representing the accuracy and resolution of information stored in the Signal Level field 1114 is stored in a Coefficient Size field 1113.

Figure 12:
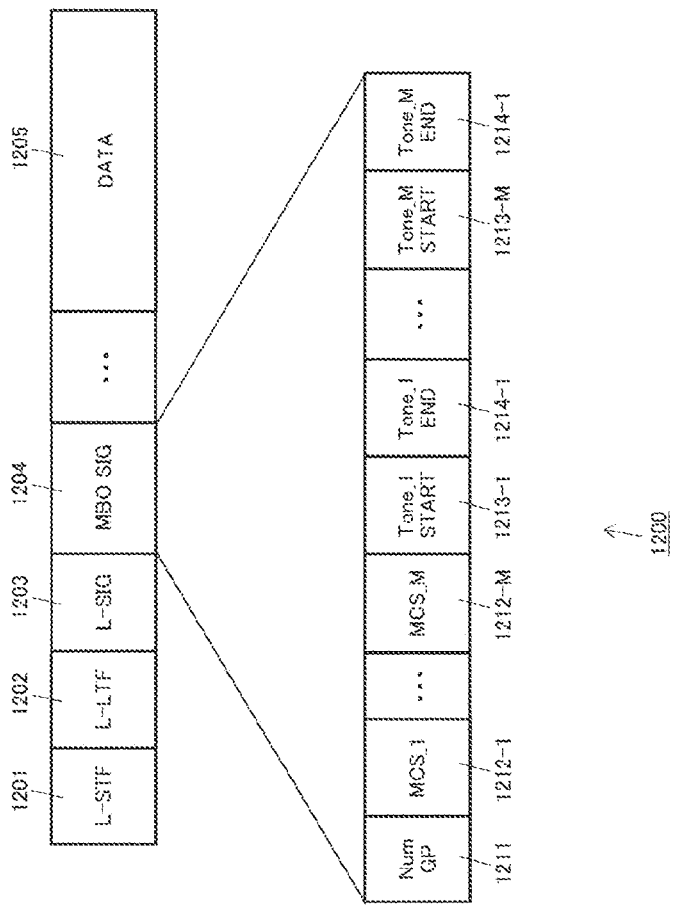
FIG. 12 is a diagram illustrating a configuration example of a data frame 1200.

FIG. 12 illustrates a configuration example of a data frame 1200. The frame 1200 is used when data is transmitted from the AP to an STA in the data transmission phase (F560).

Information used by a communication terminal that has received the frame 1200 for time synchronization and frequency synchronization is stored in a Legacy (L)-STF field indicated by reference numeral 1201.

A reference signal including information for estimating a propagation path to the transmission source of the frame 1200 in the communication terminal that has received the frame 1200 is stored in an L-LTF field indicated by reference numeral 1202. Information used for time synchronization and frequency synchronization may be stored in the L-LTF field 1202 as in the case of L-STF.

Information including those indicating the length of a data part after the field 1203 is stored in an L-SIG field indicated by reference numeral 1203.

It is assumed that the L-STF field 1201, the L-LTF field 1203, and the L-SIG field 1203 are simultaneously transmitted in Band1 and Band2. They may be transmitted in other frequency bands that can be used in the communication system.

Information indicating frequency bands in which the subsequent data signal is transmitted to STA1 and STA2 and an MCS is stored in an MBO SIG field indicated by reference numeral 1204. Although information on STA1 and STA2 is stored in the MBO SIG field 1204 through Band1 and Band2, respectively, information on both STA1 and STA2 may be stored therein.

The MBO SIG field 1204 is configured to indicate an MCS set for each subcarrier or for each group of subcarriers (in other words, for each frequency resource block). Hereinafter, the information included in the MBO SIG field 1204 will be described.

Information indicating the number of divided frequency bands used for transmission of the frame 1200 is stored in a Num Gp field indicated by reference numeral 1211. In the example illustrated in FIG. 12, it is assumed that frequency bands are divided into M groups (where M is an integer of 1 or more).

Information indicating an optimal MCS (modulation multi-value and coding method) used at the time of data transmission for each of M divided groups of frequency bands is stored in each frame of MCS_1, . . . , MCS_M indicated by reference numerals 1212-1, . . . , 1212-M.

Information indicating frequency bands of a first group obtained by dividing frequency bands into M groups is stored in each field of Tone_1 START and Tone_1 END indicated by reference numerals 1213-1 and 1214-1. For example, when different subcarrier numbers are set in order for respective subcarriers to be used, information indicating the first subcarrier number and the last subcarrier number of the first group (including the lowest frequency) is stored in the Tone_1 START field 1213-1 and the Tone_1 END field 1214-1.

Further, information indicating frequency bands of an M-th group obtained by dividing the frequency bands into M groups, for example, the first subcarrier number and the last subcarrier number of the M-th group (including the highest frequency) may be stored in a Tone_M START field 1213-M and a Tone_M END field 1214-M.

However, when the frequency bands are equally divided by a fixed size (that is, the same number of subcarriers), the Tone_1 START field 1213-1, the Tone_1 END field 1214-1, . . . , the Tone_M START field 1213-M, and the Tone_M END field 1214-M are unnecessary.

Although the L-STF field 1201, the L-LTF field 1203, and the L-SIG field 1203 are simultaneously transmitted in Band1 and Band2, they may be transmitted in a frequency band that can be used in common by STA1 and STA2.

Signals transmitted by the AP to STA1 and STA2 are stored in a DATA field indicated by reference numeral 1205. Although the DATA field 1205 is transmitted simultaneously in both the frequency bands of Band1 and Band2, the DATA field 1205 in Band1 includes information destined for STA1 and the DATA field 1205 in Band2 includes information destined for STA2.

Figure 13:
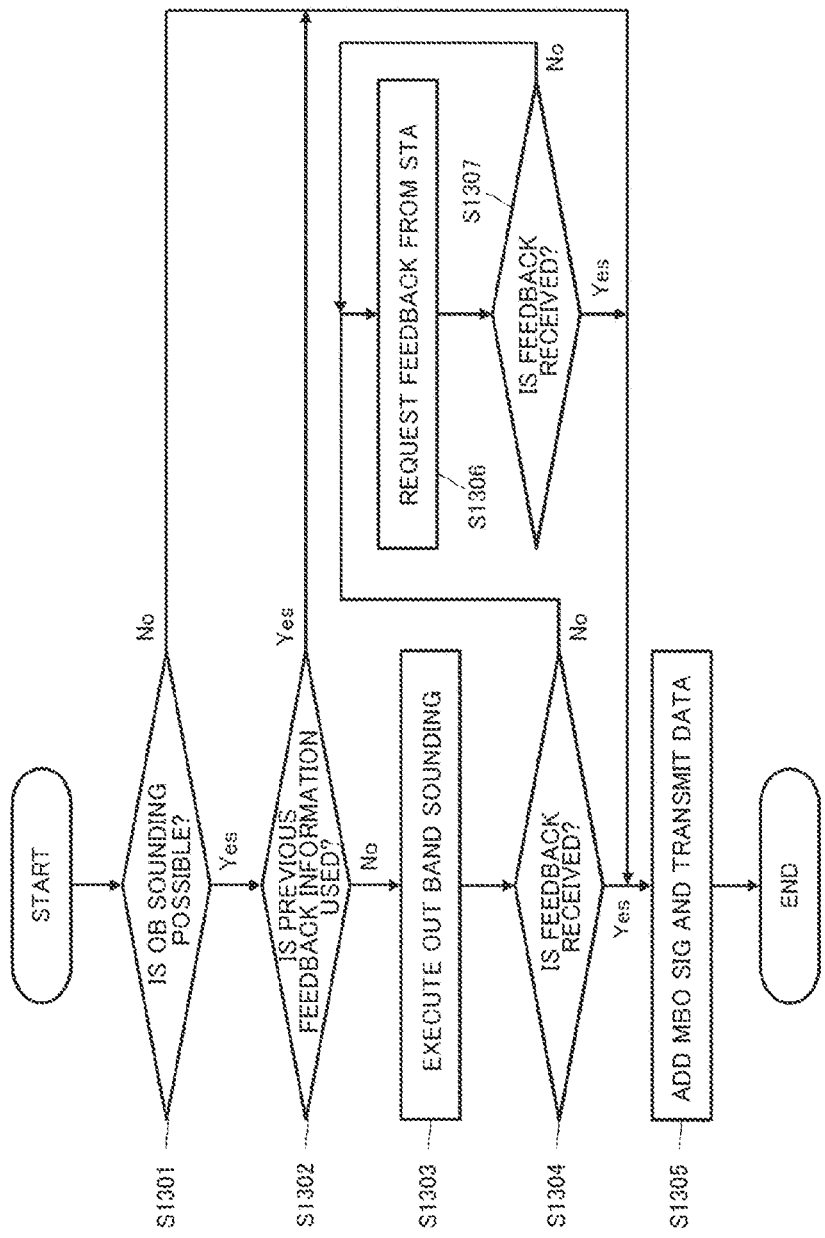
FIG. 13 is a flowchart illustrating a processing procedure for performing Out band Sounding and data transmission in the AP.

FIG. 13 illustrates a processing procedure for executing Out band Sounding and data transmission in an AP in the form of a flowchart. It is assumed that this processing procedure is executed under the overall control of the control unit 210 of the communication device 200 operating as an AP, for example.

The AP exchanges capability information with an STA in a preceding capability exchange phase (F510). First, the AP checks whether it is possible to execute Out band Sounding with the target STA on the basis of information described in the OB Sounding field of the capability information frame (refer to FIG. 6) received from the target STA (step S1301).

If Out band Sounding cannot be executed (No in step S1301), the AP transmits a DATA frame having MBO SIG added thereto (refer to FIG. 12) to the STA without executing Out band Sounding (step S1305) and ends this processing.

On the other hand, if Out band Sounding can be executed (Yes in step S1301), the AP further checks whether to use information of a Feedback frame previously received from the target STA (step S1302).

If the information of the previously received Feedback frame is used (Yes in step S1302), the AP transmits a DATA frame having MBO SIG added thereto (refer to FIG. 12) to the STA without executing Out band Sounding (step S1305) and ends this processing.

If the information of the previously received Feedback frame is not used (No in step S1302), the AP executes Out band Sounding with the target STA (step S1303).

The AP executes Out band Sounding, for example, according to the communication sequence illustrated in FIG. 7. That is, the AP transmits the Partial Sounding Announcement frame to the target STA and then transmits P-NDP-S and P-NDP-I frames for sounding in an arbitrary order.

Thereafter, when the AP receives the Feedback frame from the target STA (Yes in step S1304), the AP determines an MCS of a signal to be transmitted to the STA for each subcarrier or each group of subcarriers on the basis of information described in the Feedback frame. Then, the AP transmits a DATA frame (refer to FIG. 12) to which MBO SIG including information on the MCS determined for each subcarrier or each group of subcarriers has been added to the STA (step S1305) and ends this processing.

Further, when the AP does not receive the Feedback frame from the target STA (No in step S1304), the AP requests feedback from the STA (step S1306) until the Feedback frame can be received (No in step S1307).

Then, when the AP receives the Feedback frame from the STA according to the feedback request (Yes in step S1304), the AP determines an MCS of a signal to be transmitted to the STA for each subcarrier or each group of subcarriers on the basis of information described in the Feedback frame, transmits a DATA frame (refer to FIG. 12) having MBO SIG added thereto to the STA (step S1305), and ends this processing.

In the first example, when the STA estimates an SINR in a communication environment in which interference due to out-of-band leakage exists, it is possible to curb decrease in the effective rate due to estimation by continuously transmitting frames for estimation (P-NDP-S and P-NDP-I) in different frequency bands (Band1 and Band1) to decrease the time required for estimation.

In the first example, when an SINR of only frequencies that are subject to interference due to out-of-band leakage is estimated, it is possible to decrease SINR estimation time and curb decrease in the effective rate due to estimation by using frames (P-NDP-S and P-NDP-I) in which a sequence for estimation is shortened.

In the first example, it is possible to optimize the capacity of the communication system by applying an optimal number of modulation multi-values and coding method for each subcarrier even at the time of data transmission in a communication environment in which interference due to out-of-band leakage exists. In this case, it is possible to curb decrease in the effective rate due to overhead increase by applying the number of modulation multi-values and the coding method to be changed or notified at an appropriate granularity such as grouped subcarriers instead of each subcarrier.

Example 2

Figure 14:
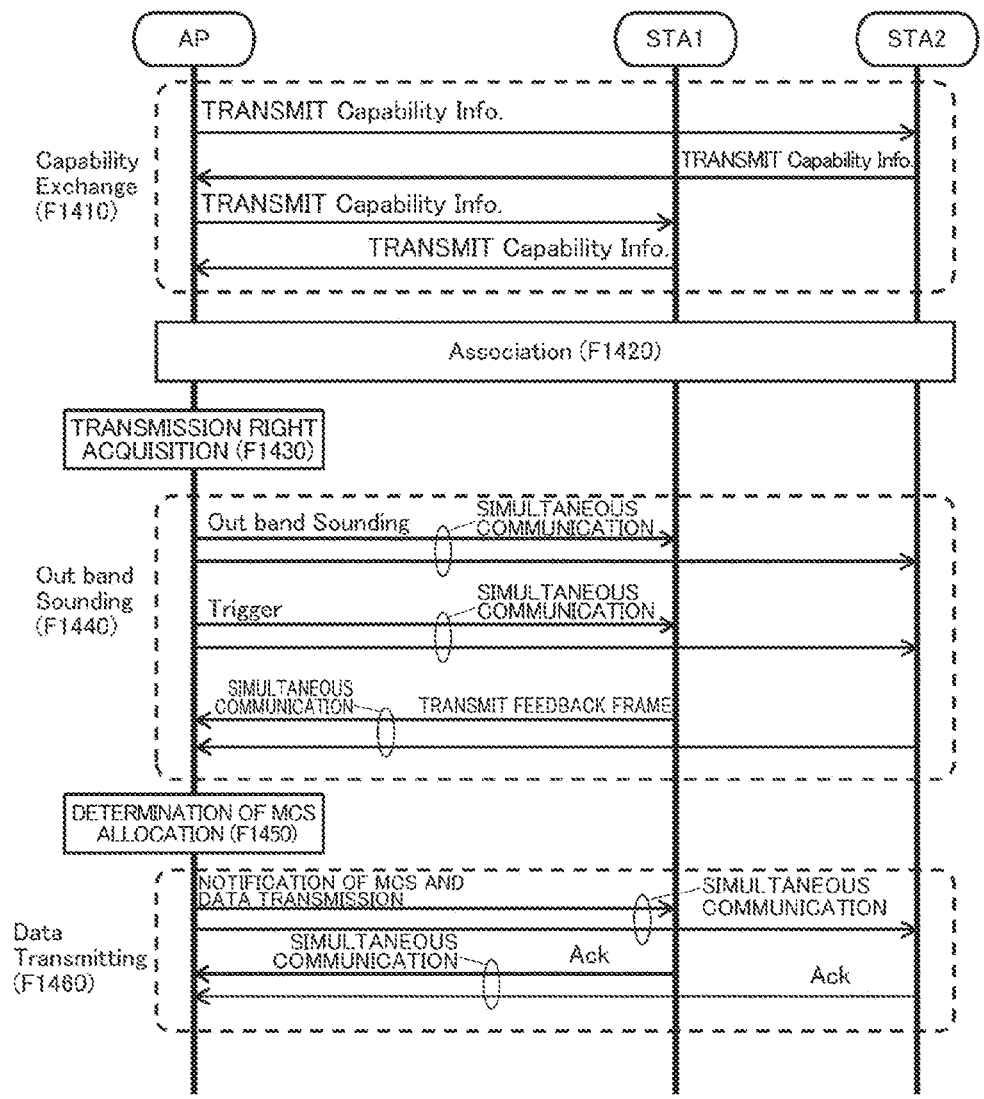
FIG. 14 is a diagram illustrating an example of a communication sequence executed between the AP and STA1 and STA2 (second embodiment).

FIG. 14 illustrates an example of a communication sequence executed between an AP and STA1 and STA2 as a second example. In the communication system including the AP, STA1 and STA2, it is assumed that the AP performs wireless communication with STA1 using Band1 and performs wireless communication with STA2 using Band2, as illustrated in FIG. 1. Further, it is assumed that the AP, STA1 and STA2 have the device configuration illustrated in FIG. 2 and can perform wireless communication using Band1 and Band2.

In the communication sequence illustrated in FIG. 14, six phases of Capability Exchange, Association, transmission right acquisition, Out band Sounding, determination of MCS allocation, and Data Transmitting are assumed as in the first example. The order in which each phase is executed is not limited to the example illustrated in FIG. 14. For example, Capability Exchange may be performed after Association. Further, each phase does not necessarily have to be separated. For example, Capability Exchange and Association may be simultaneously performed.

In the Capability Exchange phase (F1410), capability information including information on whether Out band Sounding can be executed is exchanged between the AP and STA2, and between the AP and STA1 (same as above).

In the Association phase (F1420), connection processing is completed between the AP and STA1 and between the AP and STA2, for example, according to an association request and an association response in accordance with IEEE 802.11 (same as above).

In the transmission right acquisition phase (F1430), the AP acquires the transmission right according to, for example, CSMA/CA, and an agreement is made between the AP and STA1 and STA2 to transmit data from the AP to STA1 and STA2 (same as above).

In the Out band Sounding phase (F1440), transmission of a frame for signal quality estimation from the AP to STA1 and STA2 and feedback from STA1 and STA2 are performed. When the AP performs simultaneous transmission to STA1 and STA2 using Band1 and Band2, each of STA1 and STA2 estimates out-of-band leakage power in a desired band on the basis of a frame for signal quality estimation. Thereafter, the AP transmits a Trigger frame including information on a timing at which STA1 and STA2 will transmit Feedback frames on the desired bands Band1 and Band2 of STA1 and STA2. STA1 and STA2 feedback information capable of determining an MCS by which signals can be received with desired quality in Band1 on the basis of estimation results to the AP at the timing indicated by the Trigger frame. Details of the Out band Sounding phases in this example will be described later.

In the MCS allocation determination phase (F1450), the AP determines an MCS of a signal to be transmitted to each of STA1 and STA2 in the subsequent data transmission phase (F1460) for each subcarrier or each group of subcarriers on the basis of information notified of by STA1 and STA2 in the Out band Sounding phase (F1440).

In the data transmission phase (F1460), data is transmitted from the AP to STA1 and STA2 using the MCS determined in the MCS allocation determination phase (F1450). Prior to data transmission (specifically, according to MBO-SIG in the header of a data frame), each of STA1 and STA2 is notified of the MCS to be used. In this notification, the MCS is notified of for each subcarrier or for each group of sub carriers.

Figure 15:
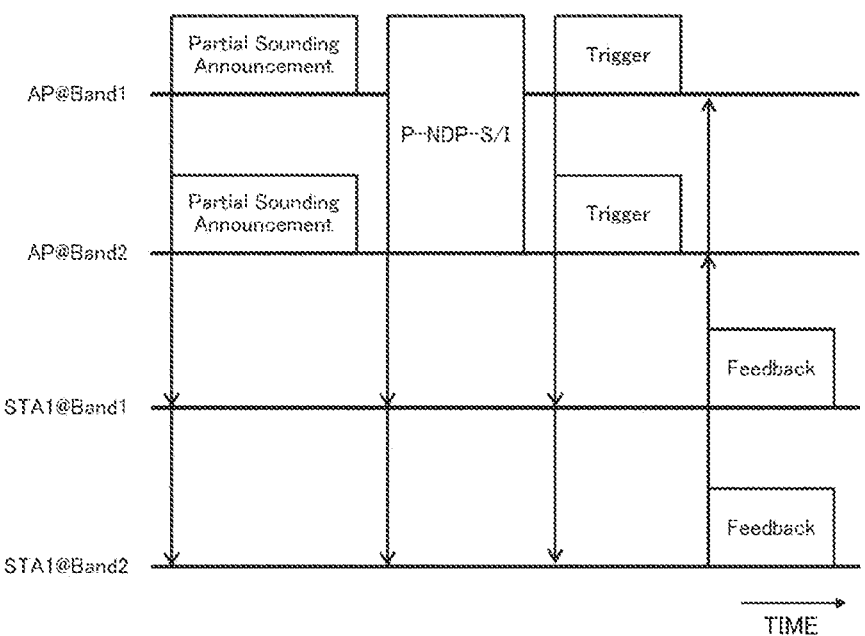
FIG. 15 is a diagram illustrating an example of a communication sequence executed between the AP and STA1 and STA2 (second embodiment).

FIG. 15 illustrates an example of a frame exchange sequence executed in the Out band Sounding phase (F1440) in this example. However, the horizontal axis is assumed to be a time axis. Further, a square box indicates a frame transmitted by the AP or STA1 in a frequency band (Band1 or Band2) corresponding to the horizontal axis thereof, and the tip of an arrow extending from each box indicates a transmission destination of the frame.

In the Out band Sounding phase (F1440), three types of frames, Partial Sounding Announcement, P-NDP-S/I, and Trigger, are transmitted from the AP to STA 1, and then a Feedback frame is returned from STA 1 to the AP.

The AP transmits the Partial Sounding Announcement frame on Band1 that is a desired band of STA1 and also transmits the Partial Sounding Announcement frame on Band2 that is a desired band of STA2 to notify the start of sounding.

The configuration of the Partial Sounding Announcement frame may be the same as that of the first example (refer to FIG. 8). The Partial Sounding Announcement frame includes information about the P-NDP-S/I frame for signal quality estimation that is transmitted immediately afterwards.

Subsequently, the AP transmits the P-NDP-S/I frame on Band1 and Band2 that are desired bands of STA1 and STA2. STA1 estimates the received power of a desired signal on the basis of the P-NDP-S/I frame received on Band1 and estimates the received power of a signal leaking out of Band2 to Band1 on the basis of the P-NDP-S/I frame received on Band2. Likewise, STA2 estimates the received power of a desired signal on the basis of the P-NDP-S/I frame received on Band2 and estimates the received power of a signal leaking out of Band1 to Band2 on the basis of the P-NDP-S/I frame received on Band1.

Subsequently, the AP transmits a Trigger frame including information on a timing at which STA1 and STA2 transmit a Feedback frame on the desired bands Band1 and Band2 of STA1 and STA2. However, the information on the timing at which the Feedback frame is transmitted may be stored in the immediately previous P-NDP-S/I frame instead of the Trigger frame.

STA1 and STA2 generate a Feedback frame in which information based on results of estimation of the signal qualities of the desired signals and the leak signals using the P-NDP-S/I frame is stored. The configuration of the Feedback frame may be the same as that of the first example (refer to FIG. 11). Then, STA1 and STA2 return the Feedback frame to the AP on Band1 and Band2 that are the desired bands at the timing indicated by the Trigger frame.

Figure 16:
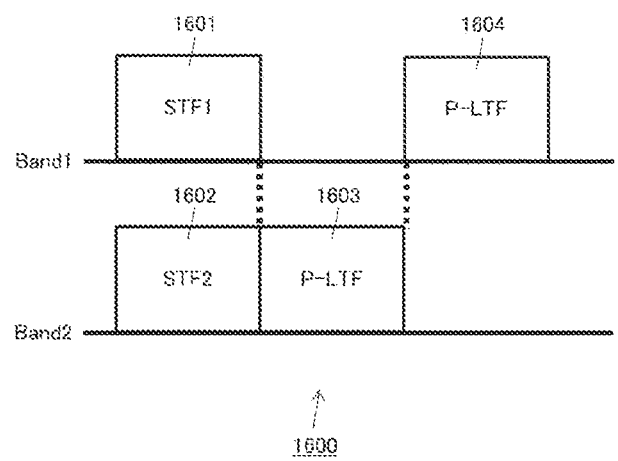
FIG. 16 is a diagram illustrating a configuration example of a P-NDP-S/I frame 1600 (second embodiment).

FIG. 16 illustrates a configuration example of a P-NDP-S/I frame 1600.

Information used by a communication terminal that has received the frame 1600 in Band1 for time synchronization and frequency synchronization is stored in an STF1 field indicated by reference numeral 1601. Further, information used by a communication terminal that has received the frame 1600 in Band2 for time synchronization and frequency synchronization is stored in an STF2 field indicated by reference numeral 1602.

Information used by the communication terminal that has received the frame 1600 in Band2 to estimate the signal quality of a desired band (provided that the communication terminal uses Band2 as the desired band) or estimate the quality of an interference signal leaking from an adjacent band to a desired band (provided that the communication terminal uses Band1 as the desired band) is stored in a P-LTF field indicated by reference numeral 1603.

Further, information used by a communication terminal that has received the frame 1600 in Band1 to estimate the signal quality of a desired band (provided that the communication terminal uses Band1 as the desired band) or to estimate the quality of an interference signal leaking from an adjacent band to a desired band (provided that the communication terminal uses Band2 as the desired band) is stored in a P-LTF field indicated by reference numeral 1604.

For the P-LTF fields 1603 and 1604, the same known signal sequence as the P-LTF field 902 of the P-NDP-S frame 900 in the first example may be used.

Further, as in the first example, the P-LTF fields 1603 and 1604 may include information for allowing the quality of only some frequencies to be estimated in signal quality estimation in Band1 and Band2. That is, the field lengths of P-LTF fields 1603 and 1604 may be dynamically changed such that the signal quality of only some frequency bands of Band1 and Band2 can be estimated.

The order in which P-LTFs are transmitted for each frequency band is not limited to the example illustrated in FIG. 16. Each STA may be notified of information indicating the order in which P-LTFs are transmitted for each frequency band, for example, through a Partial Sounding Announcement frame.

In the second example, it is also possible to curb decrease in the effective rate due to estimation by decreasing the time required for signal quality estimation in a communication environment in which interference due to out-of-band leakage exists. Further, in the second example, it is also possible to optimize the capacity of the communication system by applying an optimal number of modulation multi-values and coding method for each subcarrier at the time of data transmission in a communication environment in which interference due to out-of-band leakage exists.

In the first example, two types of sounding frames called P-NDP-S and P-NDP-I are used, and sounding is individually performed for each of STA1 and STA2 (that is, for each STA having a different desired band). On the other hand, in the second example, one type of sounding frame called P-NDP-S/I is used and sounding is simultaneously performed for both STA1 and STA2 (that is, all STAs having different desired bands), and thus the time required for sounding can be decreased. However, it is necessary to notify STA1 and STA2 of a timing at which a Feedback frame is transmitted by a Trigger frame or the like.

INDUSTRIAL APPLICABILITY

The technology disclosed in the present description has been described above in detail with reference to specific embodiments. However, it will be apparent to those skilled in the art that modification and substitution of the embodiment can be made without departing from the gist of the technology disclosed in the present description.

Although the technology disclosed in the present description can be applied to, for example, a communication systems conforming to IEEE 802.11 standards, it can also be applied to various types of multiband communication systems conforming to other wireless standards.

To sum up, the technology disclosed in the present description has been described according to an illustrative form, but the contents of the present description should not be restrictively construed. The gist of the technology disclosed in the present description should be determined in consideration of the claims.

Meanwhile, the technology disclosed in the present description may also be configured as follows.

(1) A communication device including a communication unit that transmits and receives wireless signals in a first frequency band and a second frequency band, and
  a control unit that controls a communication operation in the communication unit,
  wherein the control unit transmits a reference signal in the first frequency band and the second frequency band and controls an operation of receiving a communication result from a transmission destination of the reference signal.

(2) The communication device according to (1), wherein the control unit controls communication with a first terminal in the first frequency band and communication with a second terminal in the second frequency band to be simultaneously performed.

(3) The communication device according to (2), wherein the control unit determines the transmission destination of the reference signal on the basis of results of exchange of capability information with the first terminal and the second terminal.

(4) The communication device according to any one of (1) to (3), wherein the control unit performs control such that a notification signal for notifying of transmission of the reference signal in advance is transmitted in the first frequency band and the second frequency band.

(5) The communication device according to (4), wherein the control unit performs control such that the notification signal including at least one of a transmission time and a transmission order of the reference signal is transmitted in the first frequency band and the second frequency band.

(6) The communication device according to any one of (1) to (5), wherein the control unit dynamically changes a length of the reference signal such that signal quality of only a part of the first frequency band and the second frequency band can be estimated.

(7) The communication device according to any one of (1) to (6), wherein the notification result includes information for determining a number of modulation multi-values and a coding method at the time of data transmission to the transmission destination.

(8) The communication device according to any one of (1) to (7), wherein the control unit determines the number of modulation multi-values and the coding method for each frequency resource block at the time of data transmission to the transmission destination.

(9) The communication device according to (8), wherein the control unit notifies information regarding the number of modulation multi-values and the coding method determined for each frequency resource block through a data frame.

(10) A communication method in a communication device that transmits and receives wireless signals in a first frequency band and a second frequency band, including
a step of transmitting a reference signal in the first frequency band and the second frequency band, and
a step of receiving a communication result from a transmission destination of the reference signal.

(10-1) The communication method according to (10), wherein the notification result includes information for determining a number of modulation multi-values and a coding method at the time of data transmission to the transmission destination.

(10-2) The communication method according to (10), further including a step of determining the number of modulation multi-values and the coding method for each frequency resource block when data is transmitted to the transmission destination.

(10-3) The communication method according to (10), further including a step of transmitting a data frame including information regarding the number of modulation multi-values and the coding method determined for each frequency resource block.

(11) A communication device including a communication unit that transmits and receives wireless signals in a first frequency band and a second frequency band, and
a control unit that controls a communication operation in the communication unit,
wherein the control unit receives a reference signal in the first frequency band and the second frequency band and controls an operation of transmitting a communication result to a transmission source of the reference signal.

(12) The communication device according to (11), wherein the control unit controls the reference signal to be received in the first frequency band and the second frequency band in response to reception of a notification signal for notifying of transmission of the reference signal in advance.

(13) The communication device according to (11) or (12), wherein the control unit estimates signal quality of the reference signal received in the first frequency band and the second frequency band and controls the notification result based on the estimation result to be transmitted.

(14) The communication device according to any one of (11) to (13), wherein the control unit controls the notification result including information for determining a number of modulation multi-values and a coding method at the time of data transmission to the communication device to be transmitted.

(15) The communication device according to any one of (11) to (14), wherein the control unit controls an operation of receiving a data frame from the transmission source of the reference signal.

(16) The communication device according to (15), wherein the data frame includes information regarding a number of modulation multi-values and a coding method for each frequency resource block.

(17) A communication method in a communication device that transmits and receives wireless signals in a first frequency band and a second frequency band, including
a step of receiving a reference signal in the first frequency band and the second frequency band, and
a step of controlling an operation of transmitting a communication result to a transmission source of the reference signal.

(17-1) The communication method according to (17), wherein the reference signal is received in the first frequency band and the second frequency band in response to reception of a notification signal for notifying of transmission of the reference signal in advance.

(17-2) The communication method according to (17), wherein the signal quality of the reference signal received in the first frequency band and the second frequency band is estimated and transmitted as the notification result based on the estimation result.

(17-3) The communication method according to (17), wherein the notification result including information for determining a number of modulation multi-values and a coding method at the time of data transmission to the communication device is transmitted.

(17-4) The communication method according to (17), further including a step of receiving a data frame from the transmission source of the reference signal.

REFERENCE SIGNS LIST

200 Communication device
210 Control unit
220 Power supply unit
230 Communication unit
231 Wireless control unit
232 Data processing unit
233 Modulation/demodulation unit
234 Signal processing unit
235 Channel estimation unit
236 Wireless interface unit
237 Amplifier unit
240 Antenna unit

The invention claimed is:
1. A communication device, comprising:
a communication circuit; and
a control circuit configured to:
control the communication circuit to:
transmit, to a transmission destination, a reference signal in a first frequency band and a second frequency band; and
receive, based on the transmitted reference signal, a communication result from the transmission destination;
determine, based on the received communication result, a number of modulation multi-values and a coding method; and control the communication circuit to:
 transmit, to the transmission destination, first information indicating the determined number of modulation multi-values and the determined coding method; and
 transmit, subsequent to the transmission of the first information, data to the transmission destination based on the determined number of modulation multi-values and the determined coding method.

2. The communication device according to claim 1, wherein the control circuit is further configured to control the communication circuit to concurrently communicate with a first terminal in the first frequency band and a second terminal in the second frequency band.

3. The communication device according to claim 2, wherein the control circuit is further configured to:
 control the communication circuit to receive capability information from each of the first terminal and the second terminal; and
 determine, as the transmission destination, one of the first terminal or the second terminal based on the received capability information.

4. The communication device according to claim 1, wherein
 the control circuit is further configured to control, prior to the transmission of the reference signal, the communication circuit to transmit notification signal that notifies of the transmission of the reference signal, and
 the transmission of the notification signal is in the first frequency band and the second frequency band.

5. The communication device according to claim 4, wherein the notification signal includes at least one of a transmission time or a transmission order of the reference signal.

6. The communication device according to claim 1, wherein the control circuit is further configured to dynamically change a length of the reference signal such that a signal quality of only a part of each of the first frequency band and the second frequency band is estimated.

7. The communication device according to claim 1, wherein
 the communication result includes second information for the determination of the number of modulation multi-values and the coding method, and
 the second information includes a signal level of the reference signal received by the transmission destination.

8. A communication method, comprising:
 in a communication device:
  transmitting, to a transmission destination, a reference signal in a first frequency band and a second frequency band;
  receiving, based on the transmitted reference signal, a communication result from the transmission destination;
  determining, based on the received communication result, a number of modulation multi-values and a coding method;
  transmitting, to the transmission destination, information indicating the determined number of modulation multi-values and the determined coding method; and
  transmitting, subsequent to the transmission of the information, data to the transmission destination based on the determined number of modulation multi-values and the determined coding method.

9. A communication device, comprising:
 a communication circuit; and
 a control circuit configured to control the communication circuit to:
  receive, from a transmission source, a reference signal in a first frequency band and a second frequency band;
  transmit, based on the received reference signal, a communication result to the transmission source;
  receive, based on the transmitted communication result, first information indicating a number of modulation multi-values and a coding method; and
  receive, subsequent to the reception of the first information, data from the transmission source based on the number of modulation multi-values and the coding method.

10. The communication device according to claim 9, wherein the control circuit is further configured to control the communication circuit to:
 receive a notification signal that notifies of transmission of the reference signal; and
 receive the reference signal based on the received notification signal.

11. The communication device according to claim 9, wherein the control circuit is further configured to:
 estimate a signal quality of the reference signal received in the first frequency band and the second frequency band; and
 control, based on the estimated signal quality, the communication circuit to transmit the communication.

12. The communication device according to claim 9, wherein the communication result includes second information for determination of the number of modulation multi-values and the coding method.

13. A communication method, comprising:
 in a communication device:
  receiving, from a transmission source, a reference signal in a first frequency band and a second frequency band;
  transmitting, based on the received reference signal, a communication result to the transmission source;
  receiving, based on the transmitted communication result, information indicating a number of modulation multi-values and a coding method; and
  receiving, subsequent to the reception of the information, data from the transmission source based on the number of modulation multi-values and the coding method.

\* \* \* \* \*